Jan. 27, 1970     D. W. McBRIDE     3,491,669
CIRCULAR ARC GUIDANCE MECHANISM FOR 3-D CAMERA
Filed March 31, 1967     3 Sheets-Sheet 1
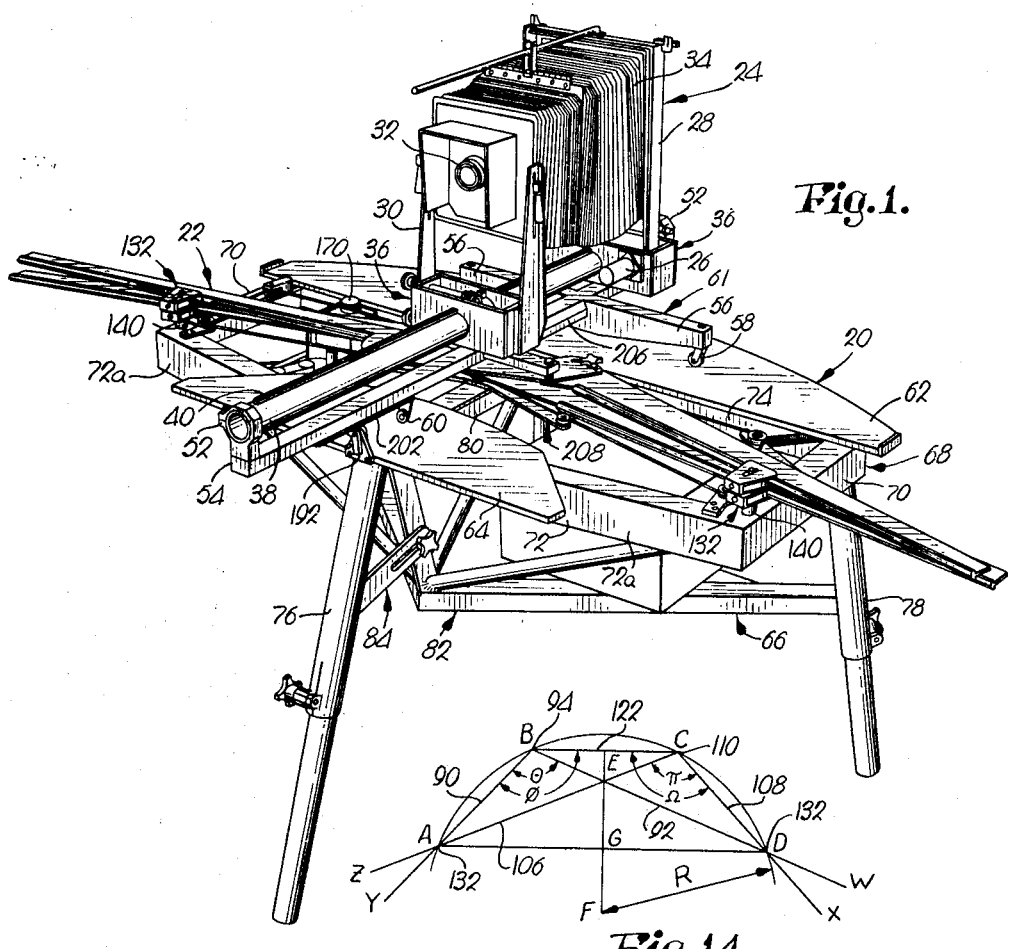
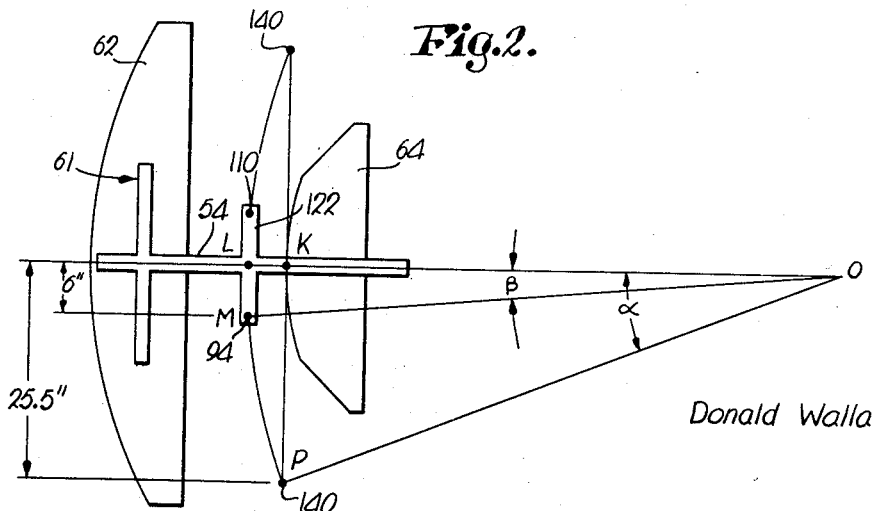
INVENTOR
Donald Wallace McBride
BY
ATTORNEYS.

Jan. 27, 1970     D. W. McBRIDE     3,491,669
CIRCULAR ARC GUIDANCE MECHANISM FOR 3-D CAMERA
Filed March 31, 1967     3 Sheets-Sheet 2
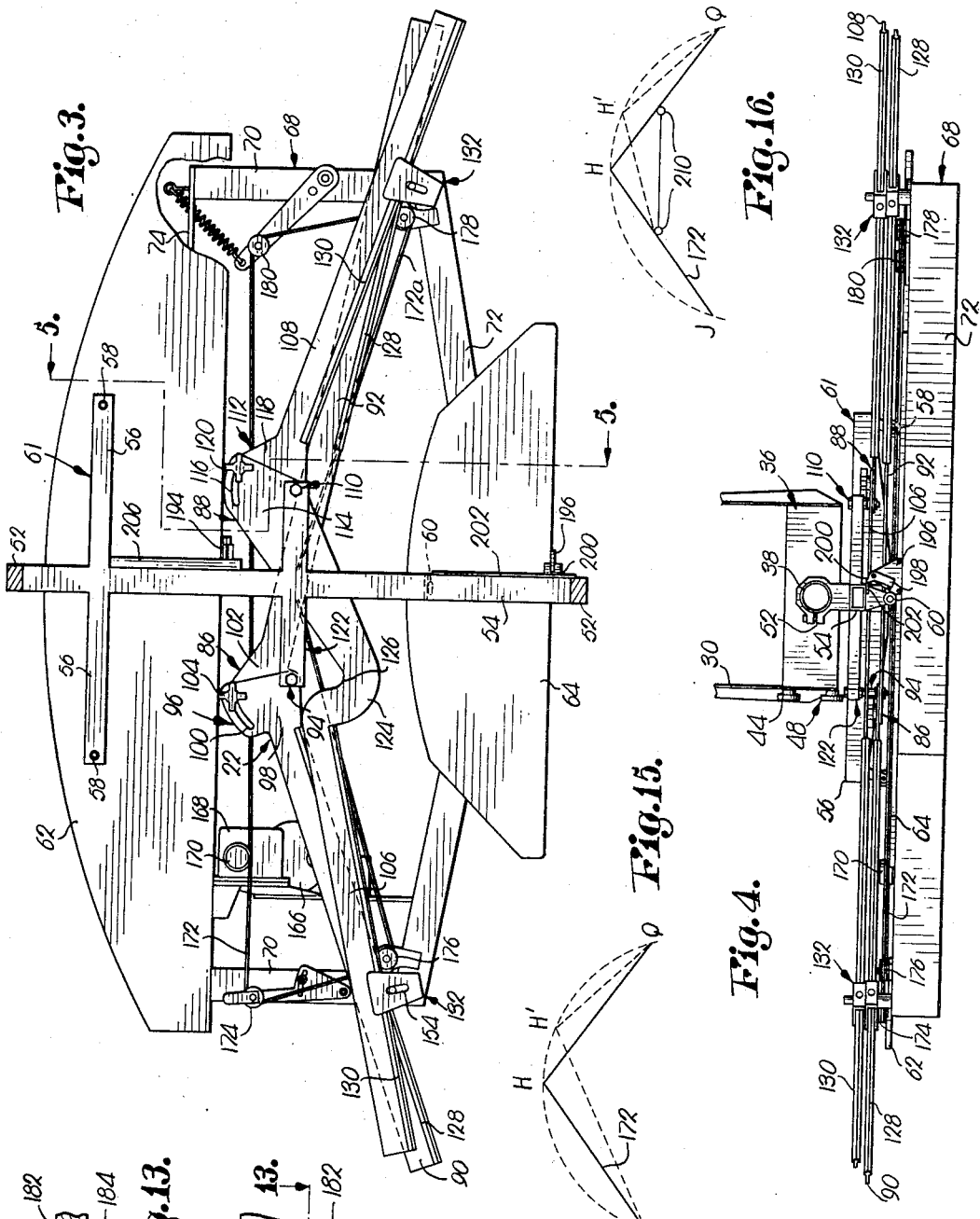
INVENTOR
Donald Wallace McBride
BY
Hovey, Schmidt, Johnson & Hovey
ATTORNEYS.

Jan. 27, 1970   D. W. McBRIDE   3,491,669
CIRCULAR ARC GUIDANCE MECHANISM FOR 3-D CAMERA
Filed March 31, 1967   3 Sheets-Sheet 3
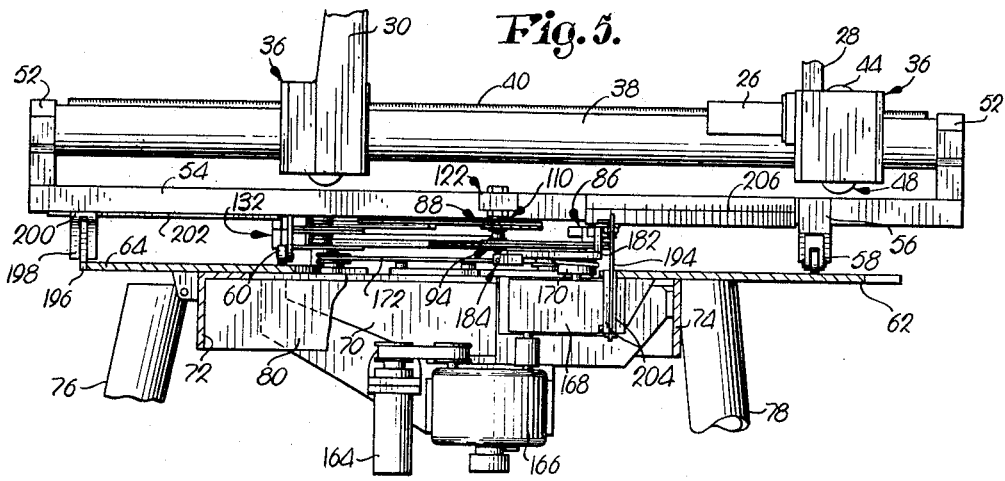
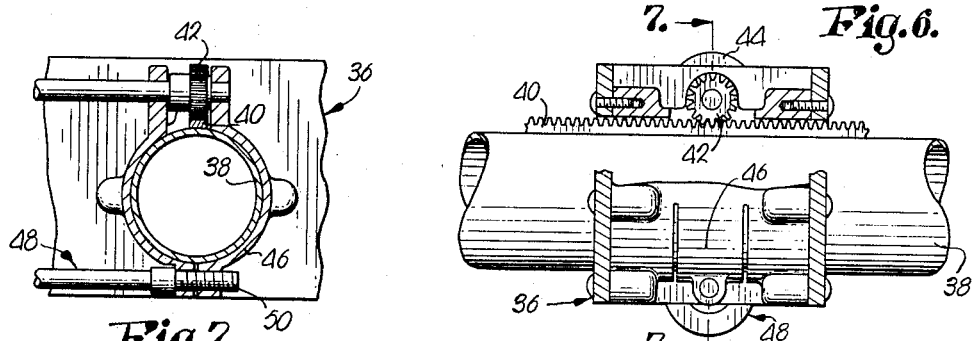
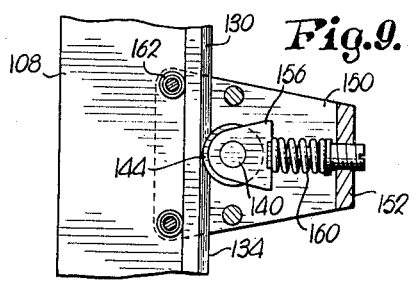
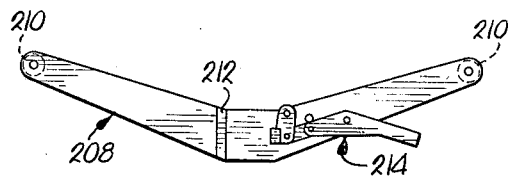
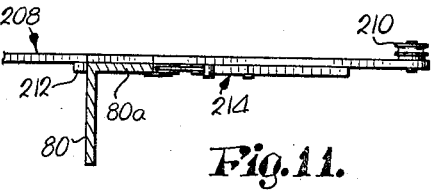
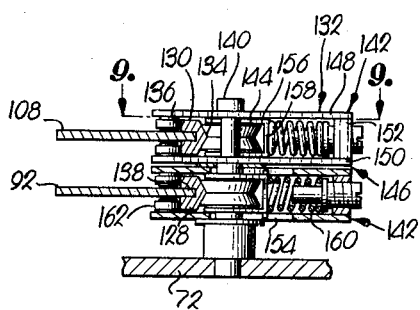
INVENTOR
Donald Wallace McBride
BY
Hovey, Schmidt, Johnson & Hovey
ATTORNEYS.

United States Patent Office 3,491,669
Patented Jan. 27, 1970

3,491,669
CIRCULAR ARC GUIDANCE MECHANISM
FOR 3-D CAMERA
Donald Wallace McBride, Independence, Mo., assignor to
Hallmark Card Incorporated, Kansas City, Mo., a
corporation of Missouri
Filed Mar. 31, 1967, Ser. No. 627,403
Int. Cl. G03b 35/08, 17/56
U.S. Cl. 95—18                                    12 Claims

ABSTRACT OF THE DISCLOSURE

A mechanism for moving a 3-D camera through a circular arc with the camera continually focused on the center of the arc. The mechanism is provided with a pair of relatively superimposed V-shaped units, each unit having a pair of angularly disposed legs which are movable rectilinearly with respect to and swingable about respective spaced pivots whereby the apex of the unit travels in a circular path. A clamp is provided for each unit respectively for releasably interconnecting the legs thereof, the angle between the latter being adjustable upon release of the clamp so that the angle between the legs and thereby the radius of the circular arc may be adjusted. The apexes of the units are spaced and a crossbar pivotally interconnects the same whereby the crossbar moves as a chord of the circle. The camera is mounted on a wheeled carriage in perpendicular relationship with the crossbar and the crossbar moves along the arc as a chord by a pulley and cable system. The entire apparatus is mounted on a compact frame to permit handling and moving from location to location.

This invention relates to mechanism for guiding an object along a circular path and particularly relates to movement control for 3-D cameras and the like. In one of its more specific aspects the present invention relates to apparatus for producing 3-dimensional image layers of the type fully disclosed and described in U.S. Letters Patent No. 3,241,429, entitled "Pictorial Parallax Panoramagram Units," issued Mar. 22, 1966.

In the above referenced patent a technique for producing 3-dimensional image layers is disclosed which includes the steps of shifting a lenticular screen across a photosensitive film in a camera while the camera is moved in a circular path, with its lens open, about an object to thereby produce an image layer which, when viewed through a lenticulated film, will cause an illusion producing a 3-dimensional effect. Manifestly, it is desirable, in the practice of such a method, to utilize structure capable of moving a camera through a circular arc in substantial synchronization with the movement of the lenticular screen across the photosensitive film in the camera. In the past, flat tables having circular tracks machined therein have been utilized for guiding a camera along a circular path. The obvious shortcoming of such a device is that the radius of the circle may not be altered and furthermore, because the radius is set, the device must be very accurately placed relative to the object being photographed so that the latter is at the exact center of the predetermined arc.

Another obvious shortcoming of the above-described type of device is that the same is not readily adaptable to motor operation of the camera and thus synchronization problems are manifest. Furthermore, the production of a circular track requires sophisticated machining procedures which are expensive and, therefore, increase the cost of manufacture of the device.

It is, therefore, the primary object of the instant invention to provide improved circular arc guidance mechanism wherein the same is adjustable for defining paths of travel of various radii whereby the utility of the mechanism is enhanced. In this connection it is an important aim to provide such mechanism with a movement control including a pair of angularly disposed straight edges interconnected by releasable means, the angle between the straight edges being determinative of the radius of the circular path defined by the mechanism.

An extremely important object of the present invention is the provision of such mechanism including a movement control adapted to guide an object such as a 3-D camera along a circular path of travel in response to rectilinear movement of the control whereby the guidance of the object is accomplished with straight edges and thus the problems incident to the production and use of circular tracks are entirely precluded.

Another important object of the present invention is to provide a compact, adjustable, circular arc guidance mechanism which is adapted for mounting on a mobile frame.

A further important object of the invention is the provision of guidance mechanism of the type described above wherein is included a prime mover coupled with the movement control to the end that the circular movement of a 3-D camera may be substantially synchronized with movement of a lenticular screen relative to a photosensitive film in the camera.

A further extremely important object of the invention is the provision of such mechanism including structure which establishes certain geometrical relationships whereby precise aiming of the camera is made possible with a minimum of calibration. In this respect, it is an object of the invention to provide a mounting bar for the camera which moves as a chord of the circular path whereby a perpendicular bisector of the bar will always pass through the center of the circle and thus, a camera which is mounted on the bar with its axis along a perpendicular bisector thereof will continually be aimed at the center of the circle as the circle is traversed by the bar.

Yet another important object of the instant invention is to provide such mechanism wherein is included calibrated structure to permit visual indication of the radius of the circular arc path of travel within the framework of the mechanism itself even though the center of the circle is remote from the mechanism and may even be infinity.

Still another object is the provision of such mechanism wherein a camera mounted thereon may be readily moved along a line extending radially from a predetermined center whereby close-up shots may be taken without moving the mechanism and without altering the setting of the guidance mechanism.

In the drawings:

FIGURE 1 is a perspective view illustrating a compact, portable 3-D camera assembly including circular arc guidance mechanism embodying the principles and concepts of the instant invention;

FIG. 2 is a schematic top plan view of the mechanism illustrating certain of the goemetrical relationships permitting visual determination of the radius of the path of travel of the camera within the boundaries of the mechanism itself;

FIG. 3 is an enlarged view, partially in cross section, looking downwardly at the assembly of FIG. 1;

FIG. 4 is an enlarged, front elevational view of the assembly;

FIG. 5 is a view taken substantially along line 5—5 of FIG. 3;

FIG. 6 is an enlarged, fragmentary detail view illustrating means for mounting the camera film support and lens support on the tubular frame of the guidance mechanism;

FIG. 7 is a cross-sectional view taken substantially along line 7—7 of FIG. 6;

FIG. 8 is an enlarged, fragmentary view illustrating details of construction of the pivot means for guiding the mechanism along a circular path of travel;

FIG. 9 is a cross-sectional view taken substantially along line 9—9 of FIG. 8;

FIG. 10 is an enlarged bottom view of cable-directing pulley means;

FIG. 11 is an enlarged, cross-sectional detail view illustrating the manner in which the means of FIG. 10 are mounted on the frame of the assembly;

FIG. 12 is an enlarged, fragmentary view partially in cross section revealing details of construction of means for interconnecting the guide mechanism with the cable drive system;

FIG. 13 is a cross-sectional view taken substantially along line 13—13 of FIG. 12;

FIG. 14 is a schematic illustration of the geometrical principles involved in the construction of the guidance mechanism; and FIGS. 15 and 16 are schematic views illustrating the geometrical principles involved in the operation of the cable-directing means illustrated in FIG. 10.

A mobile, compact 3–D camera assembly is broadly designated by the numeral 20 and is illustrated in FIG. 1 as having a movement control means in the nature of circular arc guidance mechanism 22 for moving a 3–D camera 24 along a circular arc path of travel with the camera 24 aimed at the center point of the arc. Although in the preferred embodiment the assembly 20 is utilized for controlling the mivement of a 3–D carera 24, it is to be understood that mechanism 22 could be utilized for guiding any object whose movement is to be controlled along a circular path; for example, the mechanism 22 could be utilized as a guide for a drafting instrument for drawing arcs having a very large radius or as guidance mechanism for a metal-working or cutting machine where it might be necessary to generate a circular surface.

Camera 24 is a 3–D camera having a lenticular screen (not shown) which may be moved relative to the photosensitive film in the camera by a motor 26 operably coupled with the lenticular screen. Manifestly, as disclosed and described in the above-referenced patent, the lenticular screen is moved across the photosensitive film in substantial synchronization with the movement of camera 24 about the circular arc defined by guidance mechanism 22.

Camera 24 includes a rear photosensitive film support 28 and a support 30 for the lens 32 thereof, and a bellows 34 is provided to premit relative movement of supports 30 and 28 to alter the focal length of the camera 24 in a conventional manner. A mounting mechanism 36 is disposed at the lower end of each of the supports 30 and 28 respectively for mounting the camera on a tubular element 38 having a gear rack 40 extending longitudinally thereof. Mechanism 36 permits movement of supports 28 and 30 longitudinally of element 38 and, in this respect, the mechanisms 36 are substantially identical, each having a pinion gear 42 provided with a knob 44 disposed externally of mechanism 36 for rotating the gear 42 to cause movement of the mechanism along element 38. Each mechanism 36 also includes a split ring portion 46 movable into clamping relationship with element 38 by an actuator 48 having a threaded portion 50. It can be seen viewing FIGS. 6 and 7, that rotation of actuator 48 will move portion 46 relatively toward and away from element 38 and upon release of portion 46 from element 38, rotation of knob 44 will move mechanism 36 longitudinally of element 38. Thereupon, actuator 48 may be rotated to clamp portion 46 against element 38 to maintain mechanism 36 in a fixed position relative to element 38.

Opposite ends of element 38 are clamped in brackets 52 extending upwardly from the respective ends of an elongated member 54. Member 54 is substantially parallel with element 38 and a pair of extensions 56 are rigid with member 54 and are substantially perpendicular thereto. A castor 58 depends from the outboard end of each extension 56, and a castor 60 depends from the lower side of member 54 generally toward the front of assembly 20. Member 54, extensions 56, castors 58 and castor 60 present a wheeled carriage 61 for camera 24.

Castors 58 are disposed to travel on a rear table 62, while castor 60 is disposed to travel on a forward table 64, the tables 62, 64 being supported by an adjustable framework 66. Framework 66 includes an upper frame 68 having opposed, transversely L-shaped end members 70, a generally L-shaped, front member 72 and a rear member 74. Member 72 comprises a pair of angularly disposed portions 72a underlying table 64 and member 74 underlies table 62. A front leg 76 is pivotally mounted on the underside of table 64 adjacent member 72, and a pair of rear legs 78 are disposed at opposite ends of member 74 beneath table 62. Frame 68 is provided with a transversely L-shaped, central member 80 extending between members 72 and 74, and a substructure 82 is connected to legs 78 and to frame 68 to provide structural rigidity for assembly 20. Releasable bracket means 84 couple legs 76 to substructure 82 so that leg 76 may be swung about a horizontal axis, and legs 76 and 78 are extendible and retractable so that the disposition of tables 62 and 64 is adjustable relative to the surface upon which assembly 20 rests.

Mechanism 22 includes a pair of relatively superimposed units 86 and 88. Unit 86 has a pair of elongated members 90 and 92 which are interconnected by pivot means 94 for relative swinging about a substantially vertical axis. Elements 90 and 92 are interconnected by releasable lock means 96 to present a fixed angle therebetween. Means 96 includes head portion 98 on member 90 and having an arcuate slot 100 therein as well as a head portion 102 on member 92 underlying head portion 98 of member 90. A bolt 104 extends through slot 100 and is threadably engaged with head portion 102 for clamping head portions 98 and 102 together.

Similarly, unit 88 includes a pair of elongated members 106 and 108. Members 106 and 108 are interconnected by pivot means 110. Members 106 and 108 are also interconnected by a releasable lock means 112 to present a fixed angle therebetween. Means 112 include a head portion 114 on member 106 and having a slot 116 therein. Head portion 114 overlies a head portion 118 of member 108, and a bolt 120 extends through slot 116 and is threadably engaged with head portion 118 for clamping head portions 114 and 118 together.

A crossbar structure 122 is rigid with member 54 of carriage 61 and extends laterally therefrom in opposite directions. One end of structure 122 is pivotally connected to unit 86 by pivot means 94. The opposite end of structure 122 is pivotally connected to unit 88 by pivot means 110. Unit 88 is disposed above unit 86 and thus pivot means 110 is shorter than pivot means 94, structure 122 extending substantially horizontally therebetween. Member 106 has an offset portion 124 presenting a notch 126 to provide clearance for pivot means 94.

The members 90 and 92 of unit 86 are provided with respective longitudinally extending straight elements 128 and similarly, the members 106 and 108 of unit 88 are provided with respective longitudinally extending straight elements 130. A pair of spaced pivot means 132 are operably connected with adjacent elements 128 and 130 for pivoting each unit 86 and 88 about spaced, vertical axes while guiding elements 128 and 130 for rectilinear movement. The pivot means 132 are identical and thus, only one of the same need be described in detail.

Referring to FIGS. 8 and 9, it can be seen that elements 128 and 130 are transversely irregular, each presenting an apex 134 and a pair of shoulders 136 disposed on opposite sides of a groove 138. The corresponding member 90, 92, 106 or 108 is received in the groove 138 with the shoulders 136 on opposite sides thereof. Pivot means 132 includes a pintle 140 and a separate pivot mechanism 142 for each element 128 and 130.

Mechanism 142 includes a sheave 144 which is rotatable about pintle 140 and has a transversely V-shaped periphery for complementally receiving the apex 134 of the corresponding element 128 or 130. Mechanism 142 also includes a guide means 146 pivotally mounted on pintle 140. Guide means 146 is transversely U-shaped having a top plate 148, a bottom plate 150, and an end wall 152. Each of the plates 148 and 150 have a slot 154 receiving pintle 140 therethrough. A yoke 156 is pivotal on pintle 140 and straddles the corresponding sheave 144 presenting a stop 158 disposed in spaced relationship with respect to wall 152, and a resilient device in the nature of a compression spring 160 biases wall 152 outwardly away from pintle 140. Antifriction means in the nature of a number of rollers 162 are mounted on plates 148 and 150 and are biased into engagement with shoulders 136 by the action of spring 160 on end wall 152. Manifestly, plates 148 and 150, end wall 152, and yoke 156 present means swingably mounting rollers 162 and spring 160 on pintle 140.

Assembly 20 is provided with a prime mover in the nature of an electric motor 164 for moving camera 24 in a circular path of travel. Motor 164 is coupled with a variable speed device 166 which is, in turn, coupled with a gearbox 168 having a drive wheel 170 extending upwardly therefrom. Actuation of motor 164 causes rotation of wheel 170 and the speed of the latter may be altered by manipulating the controls of device 166 in a conventional manner. A continuous cable 172 is trained around wheel 170 as well as a number of pulleys 174, 176, 178 and 180. The stretch of cable 172a between pulleys 176 and 178 is coupled with carriage 61, and for this purpose, an L-shaped bracket 182 is rigid with member 54 extending downwardly therefrom and thence forwardly beneath unit 86 for mounting an eccentric device 184. Stretch 172a of cable 172 is received through an opening 186 in device 184, the latter having a rotatable plug 188 provided with an eccentric portion 190 for clamping cable 172 in device 184 upon rotation of plug 188.

Upon actuation of motor 164, wheel 170 is rotated to cause the cable 172 to pull carriage 61 laterally in one direction or the other, depending upon the direction of rotation of wheel 170. Mechanism 22 moves with carriage 61 and, because the movement of mechanism 22 is limited by the action of pivot means 132, carriage 61, and thereby camera 24, must move in the path determined by mechanism 22. Rollers 162 continually bias elements 128 and 130 against sheaves 144 while permitting the elements 128 and 130 to move rectilinearly with respect to the axis of pintle 140. Thus, when carriage 61 is moved laterally, members 90, 92, 106 and 108 are permitted only to move rectilinearly with respect to pintle 140 and are free to swing thereabout.

The axis of pivot means 110 is located at the intersection of a pair of imaginary lines extending through the axis of the respective pintles 140 and parallel to the corresponding element 130. Similarly, the axis of pivot means 94 is located at the intersection of a pair of imaginary lines extending through the axis of respective pintles 140 and parallel to corresponding elements 128. The angle between elements 130 is equal to the angle between elements 128 and, therefore, upon actuation of motor 164, camera 24 will move in a circular arc path of travel with a radius determined by the angle between corresponding elements 128 (or 130).

Viewing FIG. 14, the geometrical relationships established by the guidance mechanism 22 are illustrated schematically. Line BY represents member 90, line BW represents member 92, line CZ represents member 106, line CX represents member 108, and line BC represents crossbar structure 122. Point B represents pivot means 94, pivot C represents pivot means 110, and points A and D represent respective pivot means 132.

It has been found that the locus of points from which lines drawn to the ends of a given line enclose a given angle, is an arc of a circle in which the given line is a chord. In FIG. 14, AD is the given line, the distance between pivot means 132 being predetermined. $\theta$ may be considered to be the given angle and, therefore, so long as line BY extends through point A, and so long as BW extends through point D, then point B will remain on the periphery of the circle whose radius is R. Similarly, if $\pi$ is equal to $\theta$, point C will move along the same circle so long as line CZ extends through point A, and line CX extends through point D. It is to be understood that lines BY, BW, CX and CZ do not coincide with the straight lines defined by apexes 134 of elements 128 and 130 but rather, extend parallel to corresponding apexes 134 and through the axes of pintles 140. Hence, point B which represents pivots means 94, and point C which represents pivot means 110 are free to move only in a direction through an arc of a circle defined by the angle established between elements 130 and between elements 128. Line BC interconnects points B and C which are on the circle and thus, line BC which represents structure 122, is a chord of the circle. A perpendicular bisector of a chord passes through the center of the circle. Thus, by placing camera 24 in perpendicular relationship with respect to the center of structure 122, the camera 24 will be continually aimed at the center of the circle.

It can be seen that by releasing bolt 104, the angle between elements 128 may be altered and similarly, by releasing bolt 120, the angle between elements 130 is altered. Thus, the radius of the circular arc path of travel for camera 24 may be altered within wide limits. To this end, a calibration guide 192 is mounted at the leading edge of table 64 and an indicator 194 is mounted at the leading edge of table 62. Guide 192 includes a bracket 196 and a stop 198 pivotally mounted thereon so that the uper portion 200 of stop 198 may be moved from a clearing position to a position in alignment with a rule 202 mounted on the lower side of member 54. Manifestly, during the use of assembly 20, stop 198 is positioned so that portion 200 thereof clears rule 202 to permit carriage 61 to move therepast. Conversely, when the mechanism 22 is to be adjusted, stop 198 is pivoted on bracket 196 so that portion 200 will engage rule 202 when carriage 61 is moved into a position midway between pivot means 132. Indicator 194 is mounted for vertical reciprocation between friction plates 204 from a lowered position clearing member 54 to an elevated position where the same is engageable with a calibrated surface block 206 mounted on the side of member 54.

It is to be appreciated that when rule 202 is in engagement with portion 200 and when indicator 194 is in engagement with block 206, member 54 will be disposed in bisecting and perpendicular relationship with respect to an imaginary line extending between the axes of pintles 140. Block 206 may be calibrated so that indicator 194 will indicate the radius of the circular arc path of travel of the axes of pivot points 94 and 110.

Viewing the schematic illustration of FIG. 2, the distance LM from the intersection point of structure 122 and member 54 to the axis of pivot means 94 is a known quantity, and in the preferred embodiment is six inches. Furthermore, the distance KP is half the distance between pintles 240, this distance, in the preferred embodiment, being 25.5 inches. The point 0 represents the center of any circle. The distance KL is related to and varies with the radius OP (or OM) of the circular arc path of travel of the axes of pivot means 94 and 110. This relationship is shown by the following algebraic equations:

$$\sin \alpha = \frac{PK}{OP} = \frac{25.5}{OP}$$

$$\cos \alpha = \frac{OK}{OP} = \sqrt{1-(\sin \alpha)^2}$$

$$OK = OP\sqrt{1-\left(\frac{25.5}{OP}\right)^2} = \sqrt{(OP)^2-(25.5)^2}$$

$$\sin \beta = \frac{ML}{OM} = \frac{6}{OM}$$

$$OM = OP$$

$$\sin \beta = \frac{6}{OP}$$

$$\cos \beta = \frac{OL}{OM} = \frac{OL}{OP} = \sqrt{1-(\sin \beta)^2}$$

$$OL = OP = \sqrt{1-\left(\frac{6}{OP}\right)^2} = \sqrt{(OP)^2-(6)^2}$$

$$KL = OL - OK = \sqrt{(OP)^2-(6)^2} - \sqrt{(OP)^2(25.5)^2}$$

Thus, by first determining the radius of the circular arc path of travel desired for the axes of pivot means 94 and 110, the last relationship may be solved for the distance KL, it being understood that point K is disposed at the midpoint of an imaginary line extending between the axes of pintles 140. Indicator 194 is located a known distance from point K and, therefore, by calibrating block 206, indicator 194 may be utilized to indicate the radius of the circular arc path of travel established for pivot points 94 and 110.

As explained above, structure 122 always represents a chord of the circular arc path of travel of the axes of pivot points 94 and 110. Furthermore, member 54 represents a perpendicular bisector of structure 122. Thus, member 54 always extends radially with respect to the center of the circular arc path of travel of pivot means 94 and 110. Thus, points along the longitudinal axes of member 54 travel in concentric circles. Manifestly, the camera 24 is movable longitudinally of element 38 and thus all portions of camera 24 travel in circles which are concentric to the circular arc path of travel of the axes of pivot means 94 and 110 because element 38 is parallel and disposed vertically with respect to member 54.

In practice, it has been found that the tangential or circumferential speed of carriage 61 varies slightly from point-to-point along its circular path of travel. This is caused by an effect illustrated in FIG. 15 where point H represents the point of interconnection between cable 172 and device 184. Point J represents pulley 176, and point Q represents point 178. As point H moves to its dotted line position H' under the influence of linear travel of cable 172, the linear travel of cable 172 is different than the circumferential travel of point H. Manifestly, it will be appreciated by those skilled in the art that cable 172 would have to travel around the same arc traversed by point H in order for the linear travel of cable 172 to equal the circumferential travel of point H. It has been found that the rate of travel of carriage 61 along its circular path of travel does not have to be absolutely constant and, in fact, the setup illustrated in FIG. 3 has been found to produce quality results.

If desired, a cable travel guide 208 may be utilized for causing cable 172 to move along a more nearly circular path of travel. Guide 208 is generally V-shaped and has an idler pulley 210 at each of the opposed ends thereof. Guide 208 is releasably mounted on center member 80 of frame 68 as best illustrated in FIG. 11, and to this end, guide 208 is provided with a shoulder 212 and clamp means 214 engageable with the horizontal flange 80a of member 80 for clamping the latter against shoulder 212.

The operation of guide 208 is illustrated schematically in FIG. 16 wherein the letters J, H and Q represent the same things as are represented by these letters in FIG. 15. It can be seen that as point H moves from its solid line position to its dashed line position H', cable 172 will more closely approach the circular path of travel of point H. Manifestly, FIGS. 15 and 16 are exaggerated for purposes of illustration and in actuality, as can be seen in FIG. 3, cable 172 is disposed relatively close to the circular path of travel of the point of intersection between structure 122 and member 54.

Mechanism 22 guides carriage 61 along a circular path of travel. Furthermore, by the simple expedient of loosening bolts 104 and 120, the radius of the path of travel of carriage 61 may be conveniently altered. It can be seen that during the alteration of the radius of the circular arc path of travel of carriage 61, crossbar structure 122 will simultaneously adjust the angle between elements 130 and the angle between elements 128 so that such angles are identical. Furthermore, the radius of the circular arc path of travel may be determined entirely from calibrations within the boundaries of assembly 20 and without connection with the center point of the circular arc path of travel. Hence, through the use of assembly 20, and particularly through the use of the novel guidance mechanism 22, camera 24 may be moved along a circular path while remaining aimed at the center of the circular path.

Having thus described the invention, what is claimed as new and desired to be secured by Letters Patent is:

1. In a movement control, the combination with an object whose movement is to be controlled of:
   two V-shaped units in superimposed relationship and each provided with a pair of elongated members having means interconnecting the same to present a fixed angle therebetween, the apex portions of said units being located in spaced relationship;
   means supporting said member of the units and including pivot means for each member respectively disposed for swinging movement of the members on spaced, parallel axes,
   each pivot means having guide means slidably receiving its member for rectilinear reciprocation longitudinally of the member;
   a support joined to and spanning the distance between the apex portions of the units; and
   means securing the object to the support in a position where the object transcribes an arc of a circle during swinging of the members about their pivots and reciprocation of the members with respect to their pivots.

2. The invention of claim 1,
said interconnecting means being releasable for selectively varying said angle between the members of each unit.

3. The invention of claim 1,
a prime mover; and
apparatus connecting the prime mover with the members of respective units for swinging and reciprocating the latter during operation of the motor.

4. The invention of claim 3,
said apparatus including a cable and associated pulleys having the cable operably coupled with the prime mover and the members of said units.

5. In a movement control, the combination with an object whose movement is to be controlled of:
   (1) a pair of relatively superimposed units, each comprising:
      a pair of elongated members having means interconnecting the same to present a fixed angle therebetween,
      means supporting said members including pivot means for each member respectively disposed for swinging movement of the members on spaced, parallel axes;
      each pivot means having guide means slidably receiving its member for rectilinear reciprocation longitudinally of the member;
   (2) structure joining the units for movement together; and
   (3) means security the object to the units in a position where the object transcribes an arc of a circle during movement of the units to swing the members about their respective pivots and to reciprocate the members with respect to their said pivots.

6. The invention of claim 5, wherein is provided a wheeled carriage for the object secured to the units.

7. The invention of claim 5, said interconnecting means each being releasable and said structure pivotally intercoupling the units, whereby said angles between the members are selectively variable upon release of said interconnecting means.

8. The invention of claim 7, the releasable interconnecting means of each unit and the pivotal intercoupling of each unit with said structure being adjacent the apexes of said angles, said apexes being spaced apart and said structure including a crossbar spanning the distance between the units.

9. The invention of claim 8, said crossbar being disposed to maintain said angles equal during variance thereof.

10. In a movement control, the combination with an object whose movement is to be controlled of:
a pair of elongated members having means interconnecting the same to present a fixed angle therebetween;
means supporting said members of the units and including pivot means for each member respectively disposed for swinging movement of the members on spaced, parallel axes,
each pivot means including a pintle, a guide sheave thereon, an antifriction means spaced from a corresponding guide means,
said members each being provided with an elongated, straight element interposed between and in slidable engagement with a respective sheave and antifriction means,
there being a resilient device for each antifriction means operable to yieldably hold each element of a corresponding member against a respective sheave proximal thereto; and
means securing the object to the members in a position where the object transcribes an arc of a circle during swinging of the members about their pivots and reciprocation of the members with respect to their pivots.

11. The invention of claim 10, and means swingably mounting each antifriction means and its device on the pintle of said corresponding sheave.

12. In an assembly having a 3-D camera, the combination with said camera of guidance mechanism comprising:
means mounting said camera for movement in a circular arc with the camera aimed at the center point of said arc and including a pair of units disposed in superimposed relationship and each provided with a pair of elongated members shiftable relatively and located to present an acute angle therebetween, there being releasable lock means coupled with the members of each unit for selectively maintaining the latter in respective predetermined fixed relative positions;
means supporting the members of said units including a pair of spaced, parallel pivot means, one member of each pair being disposed for swinging movement about one of said pivot means, the other member of each pair being disposed for swinging movement about the other of said pivot means, each pivot means having guide means slidably receiving corresponding members for rectilinear reciprocation longitudinally of respective members; and
said mounting means including elongated crossbar structure interconnecting said pairs of members and disposed for movement therewith as a chord of said arc, said camera being mounted on said crossbar structure with the aiming line thereof bisecting said crossbar in perpendicular relationship to the longitudinal axis thereof.

References Cited

UNITED STATES PATENTS

| 800,796 | 3/1908 | Horrocks. |
| 2,508,487 | 5/1950 | Bonnet. |

FOREIGN PATENTS

| 1,115,903 | 4/1949 | France. |

NORTON ANSHER, Primary Examiner

LEO H. McCORMICK, Jr., Assistant Examiner

U.S. Cl. X.R.

33—27; 95—86; 248—178